United States Patent [19]
Salerno et al.

[11] Patent Number: 5,291,105
[45] Date of Patent: Mar. 1, 1994

[54] CONTROL CIRCUIT FOR A HALF-WAVE BRUSHLESS MOTOR WITH A SURGE LIMITER

[75] Inventors: Franco Salerno, Alpignano; Pietro De Filippis, Milan, both of Italy

[73] Assignee: Industrie Magneti Marelli, Milan, Italy

[21] Appl. No.: 955,352

[22] Filed: Oct. 1, 1992

[30] Foreign Application Priority Data

Oct. 15, 1991 [IT] Italy .................. TO91A000783

[51] Int. Cl.$^5$ ........................................... H02K 23/00
[52] U.S. Cl. ................................ 318/254; 318/439; 318/138
[58] Field of Search .................... 318/254, 138, 439

[56] References Cited

U.S. PATENT DOCUMENTS

| | | | |
|---|---|---|---|
| 4,558,264 | 12/1985 | Weischedel | 318/254 |
| 4,879,498 | 11/1989 | Shinohara et al. | 318/254 |
| 5,055,751 | 10/1991 | MacKelvie | 318/254 |
| 5,115,174 | 5/1992 | Masuda et al. | 318/254 |
| 5,166,583 | 11/1992 | Min et al. | 318/138 |
| 5,198,733 | 3/1993 | Wright | 318/254 |

FOREIGN PATENT DOCUMENTS

| | | | |
|---|---|---|---|
| 60-156292 | 8/1985 | Japan | H02P 6/02D |
| 61-218390 | 9/1986 | Japan | H02P 6/02D |

OTHER PUBLICATIONS

Electronic Design, vol. 32, No. 9, Apr. 14, 1988, pp. 78-94.

Primary Examiner—William M. Shoop, Jr.
Assistant Examiner—Karen Masih
Attorney, Agent, or Firm—Fish & Richardson

[57] ABSTRACT

A control circuit for a half-wave brushless motor. The control circuit includes n circuit branches, each with an electronic power switch connected in series with the respective winding or phase of the motor across the terminals of a voltage source in parallel to the other n-1 circuit branches, a pilot circuit for providing enabling signals to render the power switches selectively conductive, current recirculation elements for dissipating transient current that flows in each phase of the motor whenever the associated power switch is turned off, and a voltage limiter for limiting, to a predetermined threshold voltage, the voltage surge due to the transient current.

4 Claims, 3 Drawing Sheets

CONTROL CIRCUIT FOR A HALF-WAVE BRUSHLESS MOTOR WITH A SURGE LIMITER

BACKGROUND OF THE INVENTION

The present invention relates to a control circuit for a half wave brushless motor.

Each time the electronic power switch (typically a MOSFET transistor) associated with a winding or phase of the motor is disabled, a high over voltage is created in this winding due to the energy inductively stored in this winding during the preceding period when the power switch is turned on.

To limit this voltage surge it is known to utilise, for example, Zener diodes disposed between the output electrode and the input electrode of the power switch (or between the output electrode and earth). This arrangement allows the voltage surge to be limited to a fixed threshold value.

This arrangement is not entirely satisfactory.

In fact, the amplitude of the voltage or back electromotive force developed in each winding or phase of the motor varies with variation of the speed of rotation thereof. This amplitude is particularly modest at low speeds, and higher at high speed. The fixed voltage threshold to which the voltage surge is limited with the known arrangements is however established on the basis of the value which this voltage surge assumes at high speed. Consequently at low speed, and therefore with relatively low back electromotive force values, rather high surge voltage peaks are allowed relative to the average amplitude of the back electromotive force. This leads to the generation of an unpleasant acoustic noise in operation.

SUMMARY OF THE INVENTION

One object of the present invention is to provide a control circuit for a brushless motor which will be able to remedy this disadvantage.

This objective is achieved according to the invention by means of a circuit of the type specified above, characterised by the fact that the said voltage limiter means are prearranged to limit the voltage surge to a threshold value which is variable as an increasing function of the speed of rotation of the motor.

The circuit according to the invention therefore operates an adaptive intervention threshold limitation and, as will be seen does not require the use of expensive Zener diodes. The voltage threshold to which the voltage surge is limited is therefore low at low speed of rotation and higher at high speed of rotation.

In one embodiment the said voltage limiter means comprise means connected to the phases of the motor and adapted to provide a threshold voltage proportional to the average value of the superimposed envelope of the back electromotive forces developed in the phases of the motor.

Conveniently, according to a further characteristic of the invention, for each phase of the motor the recirculations means comprise a current path including the electronic power switch associated with the phase, and control circuit means controlled by the voltage limiter means and operable to maintain this power switch conductive for a period of time sufficient to allow the transient current to decay each time that the said electronic switch is turned off by the said enabling signal.

Further characteristics and advantages of the invention will become apparent from the detailed description which follows, in which reference is made to the attached drawings, provided purely by way of known limitative example.

BRIEF DESCRIPTION OF THE DRAWINGS

FIG. 1 illustrates the structure of a control circuit for a three phase brushless motor comprising a rotor R and three stator windings or phases indicated W1, W2 and W3.

DETAILED DESCRIPTION OF A PRESENTLY PREFERRED EMBODIMENT

Figure 1:
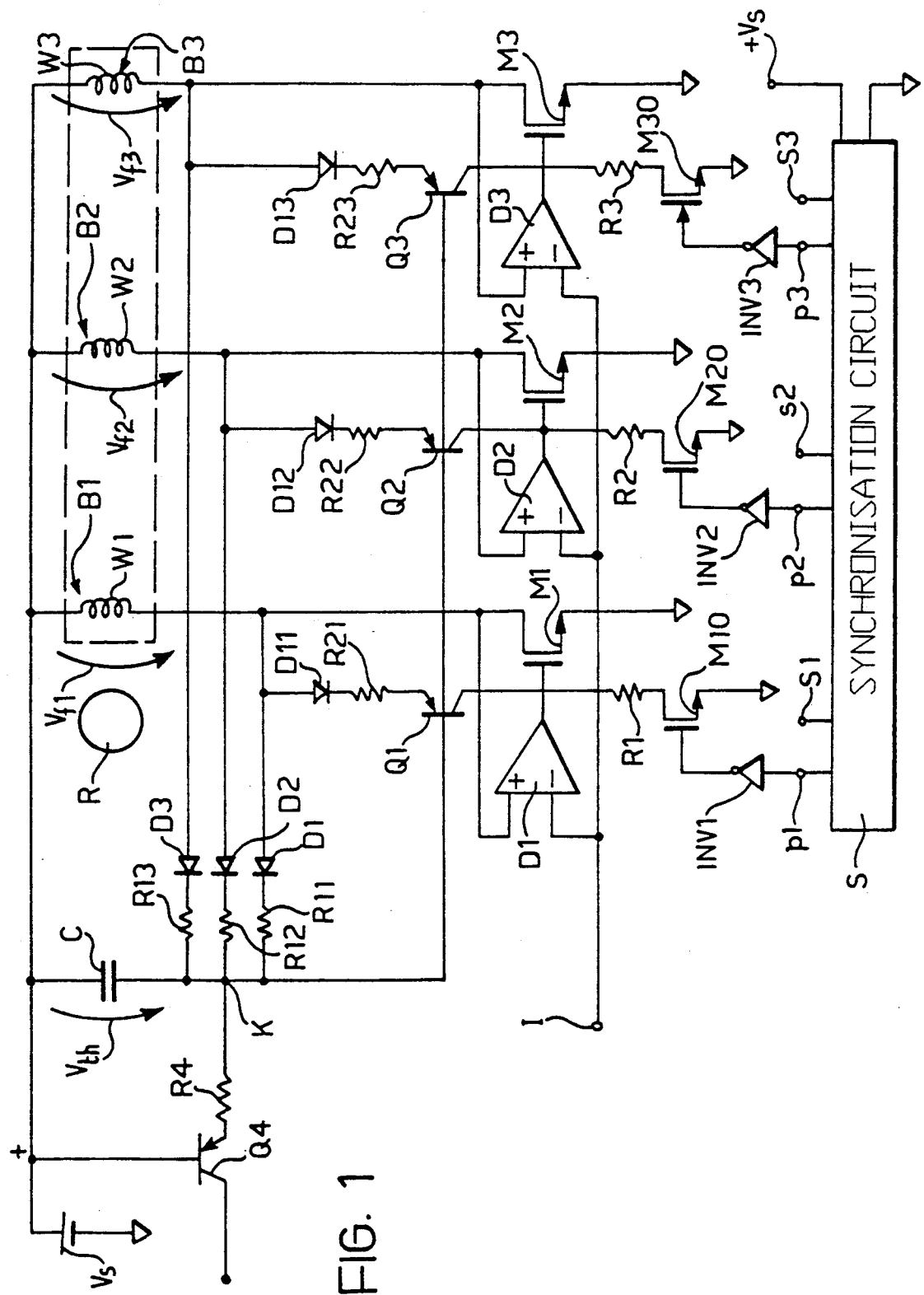
FIG. 1 is a circuit diagram of a control circuit for a half-wave three-phase brushless motor according to the invention.

These windings are electrically arranged in three circuit branches B1, B2 and B3 in series with respective power transistors M1, M2 and M3.

The transistors are preferably of the MOSFET type.

The circuit branches B1, B2 and B3 are connected in parallel with one another between the positive terminal of a DC voltage supply source Vs and earth.

The gates of the transistors M1, M2 and M3 are connected to the outputs of respective circuit drivers D1, D2 and D3.

Each of the said driver circuits has a first input (+) connected to the junction between the drain of the associated transistor and the corresponding phase of the motor.

A second input (−) of each driver circuit is connected to an input terminal I intended to receive a variable reference signal indicative of the desired torque or speed of rotation of the motor.

The reference S indicates a synchronisation circuit which has three inputs s1, s2 and s3 which are connected in an ordered manner (in a way not illustrated so as not to overload the drawing) to the drains of M1, M2 and M3. Via these inputs the synchronisation circuit S senses the voltages or back electromotive forces ("back emf") $V_{f1}$, $V_{f2}$ and $V_{f3}$ which arise, in operation, in the motor windings or phases W1, W2 and W3.

Figure 2:
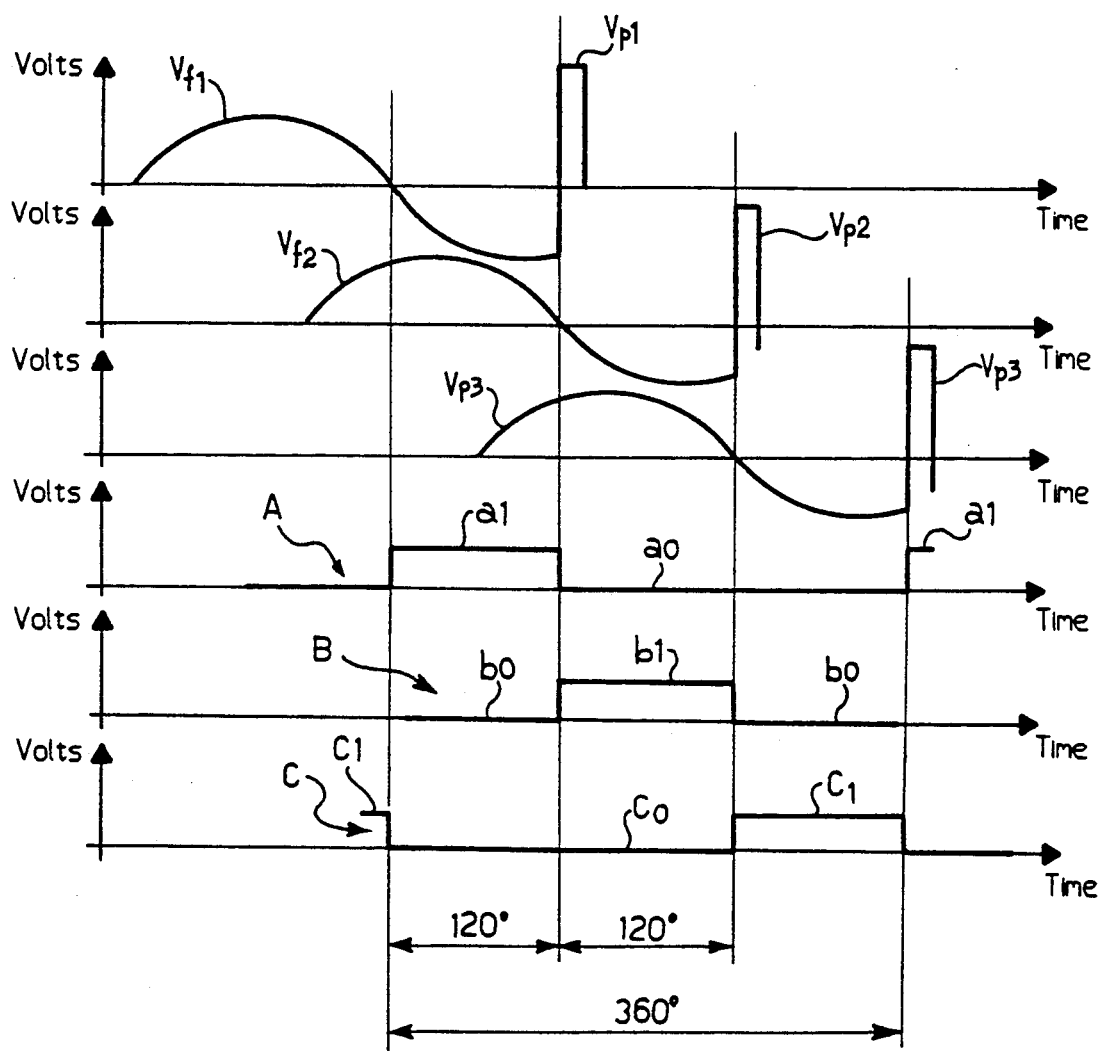
FIG. 2 is a series of diagrams which show the variation, as a function of time, of the back electromotive forces developed in the brushless motor of FIG. 1, and corresponding pilot signals for the associated MOSFET power transistors.

In a manner known per se, by detecting the passages through zero of the voltages of the phases $V_{f1}$, $V_{f2}$ and $V_{f3}$, the synchronisation circuit provides at its three outputs p1, p2 and p3 three square wave control signals phase displaced from one another by 360/3 = 120 electrical degrees, indicated A, B and C in FIG. 2. These signals have a frequency proportional to the speed of rotation of the motor and have respective enablement portions a1, b1 and c1 at "high" level, alternating with "low" level disablement portions a0, b0 and c0.

The outputs p1, p2 and p3 of the synchronisation circuit S are connected, by inverters INV1, INV2 and INV3 to the gates of the corresponding MOSFET transistors M10, M20 and M30. The sources of these transistors are each connected to earth, and the drains are connected to the gates of M1, M2 and M3 respectively through resistors R1, R2 and R3.

In operation, when a "high" portion of the signal A is present at the output p1 of the synchronisation circuit S, the transistor M10 is turned off and allows coupling of the output of the driver circuit D1 to the gate of M1. This driver circuit provides a linear feedback control of the gate voltage of the associated MOSFET power transistor. Each time that the synchronisation circuit causes the transistor M10 to turn off by the enabling signal the driver D1 modulates the gate voltage of the MOSFET transistor M1 in such a way as to make the current in the corresponding phase of the motor vary so as to make the back emf force $V_{f1}$ equal to the control voltage applied to the input terminal I thus achieving speed control.

The other driver circuits and the associated enabling transistors M20 and M30 function in a similar manner.

The back electromotive forces $V_{f1}$, $V_{f2}$ and $V_{f3}$ vary qualitatively as illustrated in FIG. 2.

As appears in this figure, when a signal A, B or C passes from a "high" level to a "low" level the associated enabling MOSFET transistor M10, M20 or M30 is rendered conductive and causes the associated MOSFET power transistor M1, M2 or M3 to be turned off. By the effect of the energy previously stored, the back electromotive force developed in the associated phase now has a short peak, or rather an excess voltage increase indicated $V_{p1}$, $V_{p2}$ and $V_{p3}$ in FIG. 2.

In the circuit according to the invention, in order to limit the voltage surge and allow recirculation of the transient current which circulates in each phase after the associated MOSFET power transistor has been switched off, a circuit is provided which at its output delivers a threshold or reference voltage $V_{th}$ which is variable adaptively in dependence on the speed of rotation of the motor. This circuit comprises three rectifier diodes D1, D2 and D3 which have respective anodes connected to the drains of M1, M2 and M3 and cathodes connected through resistors R11, R12 and R13 to a node indicated K. Between this node and the positive terminal of the voltage supply source Vs is connected a capacitor C.

The diodes D1, D2 and D3, the associated resistors R11, R12 and R13, the resistor R4 a transistor Q4 and the capacitor C constitute, together, an OR superimposition envelope demodulator assembly for the back electromotive forces developed in the motor phases. The resistor R4 and the transistor Q4 serve to discharge the capacitor C.

Figure 3:
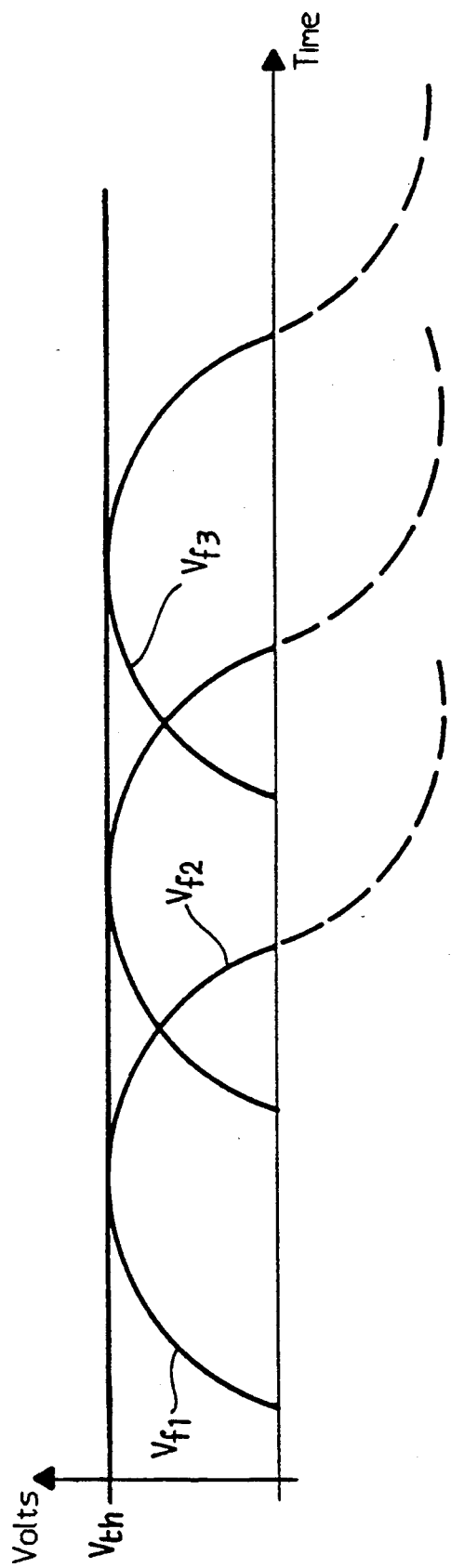
FIG. 3 is a graph which shows the variation, as a function of time, of the threshold voltage to which the voltage surge is limited with the circuit shown in FIG. 1.

In operation, across the terminals of the capacitor C there therefore appears a voltage $V_{th}$ proportional to the OR superimposition envelope of the back electromotive forces (FIG. 3). Since these back electromotive forces have amplitudes which vary with variation in the speed, the voltage across the terminals of the capacitor C also varies in dependence on the speed, and is lower for low speed and higher at high speed. This voltage is utilised as a threshold to which the voltage surge due to transient current circulating in each phase is limited upon switching off the associated power transistor.

To this end, the node K is connected to the bases of three bipolar transistors Q1, Q2 and Q3 of pnp type which have collectors connected to the gates of M1, M2 and M3 respectively and emitters connected to the drains of these MOSFET transistors through resistors indicated R21, R22 and R23 and diodes D11, D12 and D13 connected in the manner illustrated.

With the arrangement described above, the recirculation of the transient current and the limitation of the voltage surge takes place in a manner which will be described by way of example with reference to the phase W1.

When the enabling signal A passes to the "low" level the MOSFET transistor M10 becomes conductive and turns off the associated power transistor M1. In the turn-off phase (A low) the driver circuits are turned off and present a high output impedance. The back electromotive force which appears on W1 has a voltage surge peak. The voltage across the terminals of the capacitor C (which is charged to the preceding average value of the superimposition of the three phase voltages) does not succeed in following the voltage surge peak which appears on the phase W1. However, this peak causes, on the other hand, the transistor Q1 to pass to its conductive state which, with the resistor R21, the resistor R1 and the transistor M10 (which is conductive) brings the power transistor M1 into conduction, which discharges to earth the transient current which is generated in W1.

Once the voltage surge peak has passed, Q1 turns off and therefore the power transistor M1 also turns off.

With the arrangement described above, for recirculation of transient currents which are generated in the phases turn off when the associated power transistors are turned off the same power transistors associated with the phases are conveniently utilised.

Moreover, as is seen above, the voltage surge is limited to a threshold value which is not constant but which is low at low speeds and high at higher speeds. This makes it possible to avoid annoying acoustic noises from arising.

In FIG. 1, Q4 indicates a further bipolar transistor of pnp type the base of which is connected to the positive pole of the source Vs and the emitter of which is connected to the node K through a resistor R4 and the collector of which constitutes a terminal at which in operation there is available an analogue signal indicative of the speed of rotation of the motor. If it is not desired to have a current proportional to the said speed a diode may be provided in place of the transistor Q4.

Naturally, the principle of the invention remaining the same, the embodiments and the details of construction can be widely varied with respect to what has been described and illustrated purely by way of non-limitative example, without by this departing from the ambit of the present invention.

What is claimed is:

1. A control circuit for half wave brushless motor, comprising:

an assembly of n circuit branches, each of which includes an electronic power switch connected in series with a respective winding or phase of the motor, between the terminals of a DC voltage source, and in parallel with the other n-1 circuit branches;

pilot circuit means for providing an enabling signal that renders said electronic switches selectively and cyclicly conductive in a predetermined manner;

current recirculation means connected to the phases of the motor to drain transient current that circulates in each phase of the motor whenever the associated electronic power switch is turned off; and voltage limiter means for limiting to a predetermined threshold voltage the voltage surge developed in each phase of the motor by said transient current;

said threshold voltage varies proportionally with the average of the superimposition envelope of the back electromotive forces developed in each phase of the motor.

2. A circuit according to claim 1 wherein, said current recirculation means comprises a current path for each phase of said motor that includes the associated electronic power switch and said pilot circuit means, said recirculation means being capable of rendering said electronic power switch conductive for a time period sufficient to allow the transient current to drain each time said electronic power switch is turned off by said enabling signal.

3. A circuit according to claim 1, wherein, said voltage limiter means comprises n rectifier diodes each of which has an anode connected to a corresponding phase of the motor and a cathode OR- connected to the cathode of the other rectifier diodes, and a capacitor connected to the cathode of each of said rectifier diodes in such a way as to form a demodulator for providing an OR-superimposition of the envelope of the back electromotive forces developed in the n phases of the motor.

4. A circuit according to either claim 2 or claim 3, wherein, said electronic power switches associated with each phase of the motor have an output electrode and an input electrode, said pilot circuit means comprises, for each phase of the motor, a transistor having a collector-emitter path connected between the output electrode and the input electrode of said electronic power switches, and having a base connected to said capacitor.

* * * * *